(12) United States Patent  (10) Patent No.: US 6,722,296 B2
Reilly  (45) Date of Patent: Apr. 20, 2004

(54) TREE SPADE SYSTEM

(76) Inventor: Clyde L. Reilly, P.O. Box 66, Crystal, ND (US) 58222

( * ) Notice: Subject to any disclaimer, the term of this patent is extended or adjusted under 35 U.S.C. 154(b) by 0 days.

(21) Appl. No.: 10/226,598

(22) Filed: Aug. 22, 2002

(65) Prior Publication Data

US 2004/0050309 A1 Mar. 18, 2004

(51) Int. Cl.⁷ .............................................. A01G 23/02
(52) U.S. Cl. ........................................ 111/101; 37/302
(58) Field of Search .......................... 37/302, 303, 403, 37/405, 406, 404, 903; 111/101, 102, 100; 47/1.01 P

(56) References Cited

U.S. PATENT DOCUMENTS

| 3,364,601 | A | | 1/1968 | Korenek | 37/2 |
|---|---|---|---|---|---|
| 3,558,177 | A | * | 1/1971 | Snead | 111/101 |
| 3,618,234 | A | * | 11/1971 | Bates | 111/101 |
| 3,775,876 | A | * | 12/1973 | May | 111/101 |
| 4,031,637 | A | * | 6/1977 | Stocker | 111/101 |
| 4,286,398 | A | | 9/1981 | Lemond et al. | 37/2 |
| 4,341,025 | A | * | 7/1982 | Stocker | 111/101 |
| 4,403,427 | A | | 9/1983 | Dahlquist | 37/2 |
| 4,417,416 | A | * | 11/1983 | Johnson | 111/101 |
| 4,625,662 | A | * | 12/1986 | Heinzen | 111/101 |
| 4,658,518 | A | * | 4/1987 | Korenek | 111/101 |
| 5,081,941 | A | | 1/1992 | Weeks | 111/101 |
| 5,129,336 | A | | 7/1992 | Vos | 111/101 |
| 5,459,952 | A | * | 10/1995 | Tillaart et al. | 37/302 |
| 5,485,691 | A | * | 1/1996 | Stevens et al. | 37/302 |
| 5,600,904 | A | * | 2/1997 | Bowling | 37/302 |
| 5,713,419 | A | * | 2/1998 | Kaczmarski et al. | 172/2 |
| 5,715,614 | A | * | 2/1998 | Ookuwa et al. | 37/302 |
| 5,957,213 | A | * | 9/1999 | Loraas et al. | 172/2 |
| 6,070,344 | A | * | 6/2000 | Roberts | 37/302 |
| 6,253,690 | B1 | * | 7/2001 | Cox | 111/101 |
| 6,530,333 | B1 | * | 3/2003 | Cox | 111/101 |

FOREIGN PATENT DOCUMENTS

FR  2822021  * 9/2002

* cited by examiner

Primary Examiner—Victor Batson

(57) ABSTRACT

A tree spade system for providing a vehicle-mounted system capable of excavating large and heavy plants and transporting them while locking the system into place to prevent damage to the vehicle and plant The tree spade system includes a vehicle with a tilting mechanism, lifting mechanism and digging apparatus. The digging apparatus utilizes dual hydraulic cylinders to draw the digging blades into the soil surrounding the plant to be removed and transported. The digging apparatus is designed with the lowest profile possible to minimize the removal of lower branches from the plant to be transported. When the digging apparatus is lifted and tilted back upon the vehicle the system has a unique locking mechanism for holding the digging apparatus into place.

19 Claims, 8 Drawing Sheets

TREE SPADE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to plant transplanting devices and more specifically it relates to a tree spade system capable of excavating large and heavy plants and transporting them while locking the system into place to prevent damage to the vehicle and plant.

2. Description of the Related Art

Tree transplanting systems have been in use for years. Typically, these systems include a vehicle with a digging apparatus attached to a tilting and lifting mechanism. The vehicle is positioned next to the tree which is to be removed and the tilting mechanism tilts the digging apparatus off the end of the vehicle. The digging apparatus is typically comprised of four spoon shaped curved blades each attached to a single hydraulic cylinder. These tree transplanting systems allow for the blades to be positioned around the plant to be removed and then forced into the ground surrounding the plant. The systems are designed so that the four blades are drawn together to sever the roots of the plant and to draw up sufficient soil to create a root ball surrounding the severed roots. A lifting mechanism lifts the digging apparatus with the blades and plant out of the ground. The digging apparatus, with the uprooted plant, is tilted back upon the vehicle and the plant transported to a new location for planting.

There are numerous problems within the prior art surface when moving larger trees. With current systems the bigger the tree the bigger the digging apparatus needs to become. The section of the digging apparatus for holding the blades has to be proportionally increased to correspond to the increase in size of the hydraulic cylinders necessary to drive the larger blades required for removing a larger tree. This increase in size creates an apparatus too large to fit on a standard commercially available vehicle. In addition, as the apparatus becomes larger it correspondingly becomes proportionally unsafe, as it is increasingly difficult to maintain the digging apparatus and tree in position relative to the vehicle when the vehicle is moving. When the tree to be moved includes numerous low growing branches this larger digging apparatus requires numerous lower branches to be removed so that the system can be moved into position and utilized.

Examples of patented devices which may be related to the present invention include U.S. Pat. No. 5,081,941 to Weeks; U.S. Pat. No. 4,403,427 to Dahlquist; U.S. Pat. No. 5,600,904 to Bowling; U.S. Pat. No. 5,129,336 to Vos; U.S. Pat. No. 4,286,398 to Lemond et al.; U.S. Pat. No. 3,364,601 to Korenek; and U.S. Pat. No. 4,417,416 to Johnson.

While these devices may be suitable for the particular purpose to which they address, they are not as suitable for providing a vehicle-mounted system capable of excavating large and heavy plants and transporting them while locking the system into place to prevent damage to the vehicle and plant. With these systems, as the plant that is to be transported becomes larger, the digging apparatus for placing the blades into place becomes too large for practical use. The digging apparatus will not fit on standard commercially available vehicles and the vehicle would become unsafe to drive.

In these respects, the tree spade system according to the present invention substantially departs from the conventional concepts and designs of the prior art, and in so doing provides an apparatus primarily developed for the purpose of providing a vehicle-mounted system capable of excavating large and heavy plants without requiring the lower branches to be removed and transporting the plants while locking the system into place to prevent damage to the vehicle and plant

BRIEF SUMMARY OF THE INVENTION

In view of the foregoing disadvantages inherent in the known types of tree transplanting systems now present in the prior art, the present invention provides a new tree spade system construction wherein the same can be utilized for providing a vehicle-mounted system capable of excavating large and heavy plants and transporting them while locking the system into place to prevent damage to the vehicle and plant.

The general purpose of the present invention, which will be described subsequently in greater detail, is to provide a new tree spade system that has many of the advantages of the tree transplanting systems mentioned heretofore and many novel features that result in a new tree spade system which is not anticipated, rendered obvious, suggested, or even implied by any of the prior art tree transplanting systems, either alone or in any combination thereof.

To attain this, the present invention generally comprises a vehicle with a tilting mechanism, lifting mechanism, digging apparatus and locking mechanism. The digging apparatus utilizes dual hydraulic cylinders to draw the digging blades into the soil surrounding the plant to be removed and transported. The digging apparatus is designed with the lowest profile possible to minimize the removal of lower branches from the plant to be transported. When the digging apparatus is lifted and tilted back upon the vehicle the system has a unique locking mechanism for holding the digging apparatus into place for safe transport.

The vehicle, lifting mechanism and tilting mechanism can utilize current, standard, commercially available systems. The digging apparatus and securing method are unique innovations to currently available plant transplanting and transportation systems.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a tree spade system that will overcome the shortcomings of the prior art devices.

A second object is to provide a tree spade system for providing a vehicle-mounted system capable of excavating large and heavy plants and transporting them while locking the system into place to prevent damage to the vehicle and plant.

Another object is to provide a tree spade system that fits on commercially available vehicles.

An additional object is to provide a tree spade system that uses multiple hydraulic cylinders per blade.

A further object is to provide a tree spade system that is safe to operate.

Another object is to provide a tree spade system that pulls the blades into the ground.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
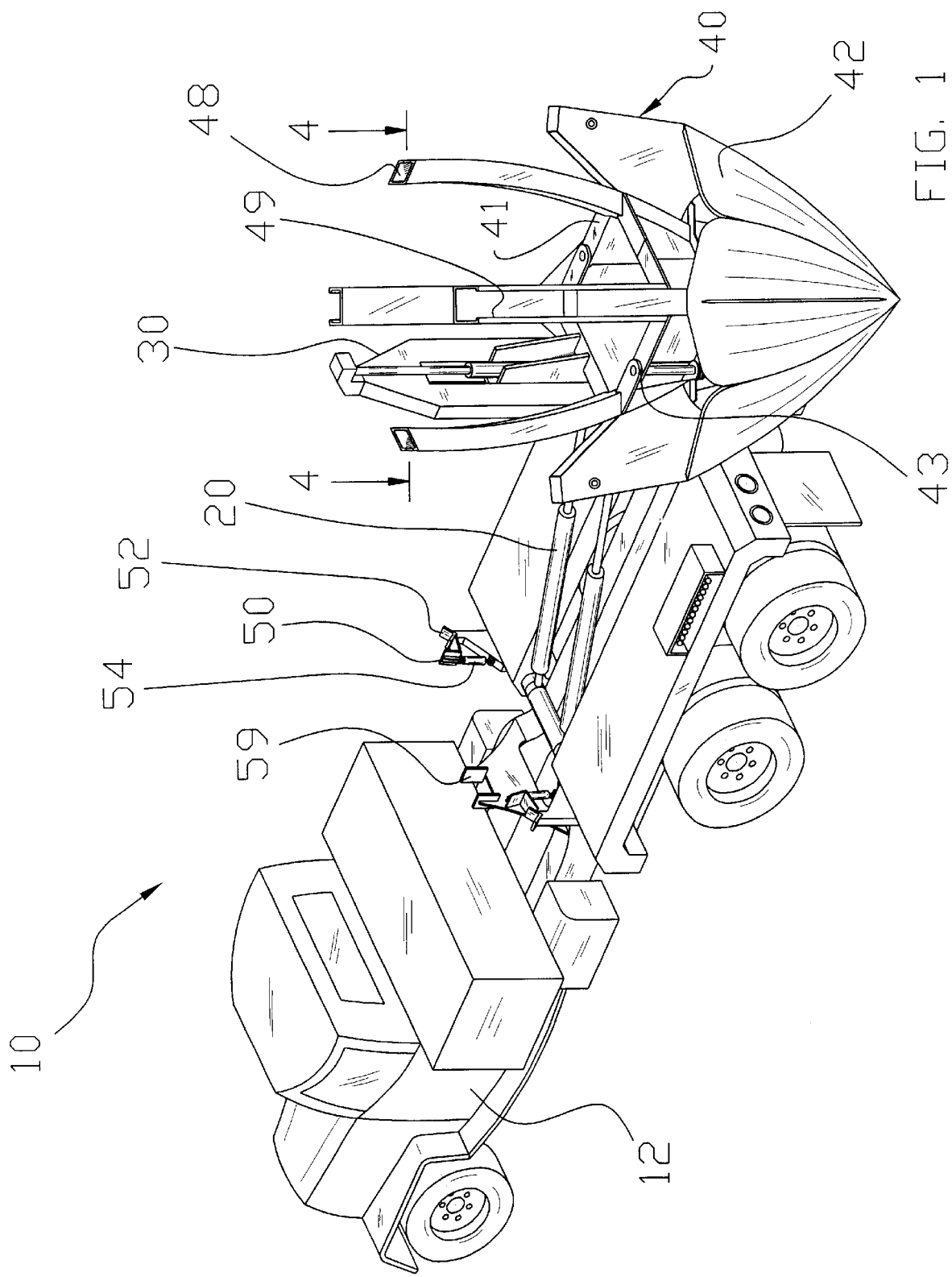
FIG. 1 is an upper perspective view of the present invention.
Figure 2:
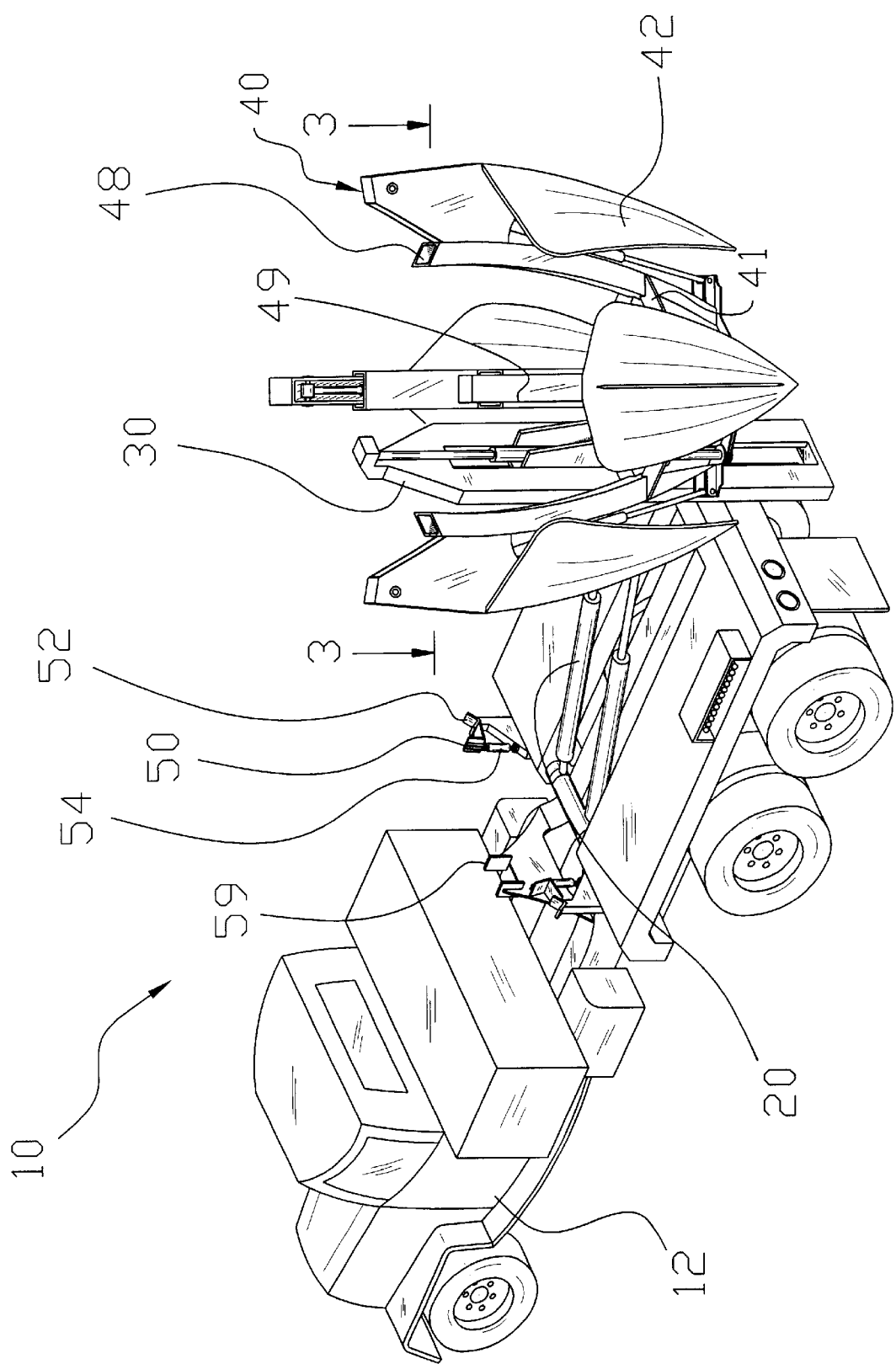
FIG. 2 is an upper perspective view of the present invention with blades in digging position.
Figure 3:
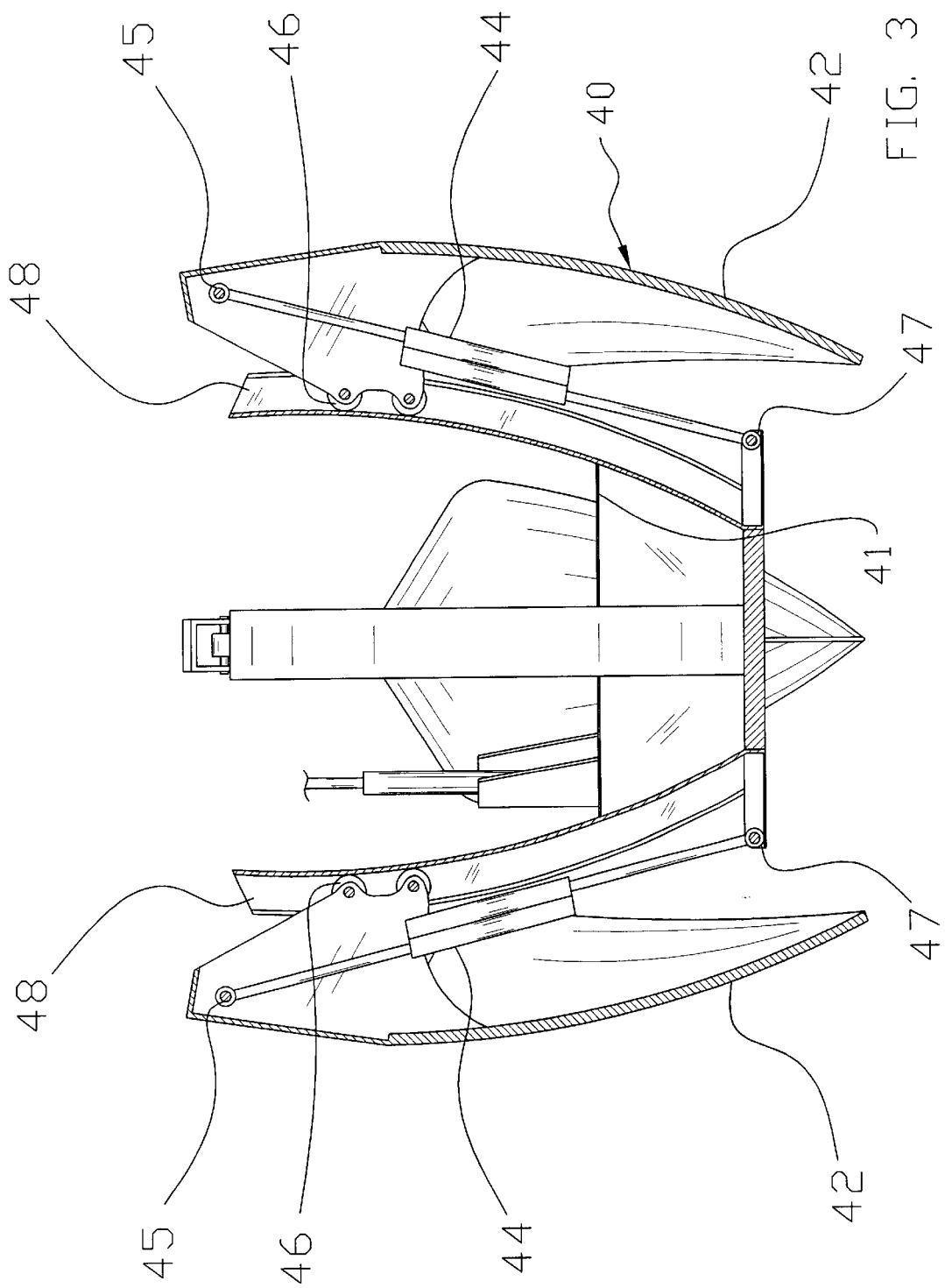
FIG. 3 is a sectional view of the digging apparatus in the open digging position along line 3—3 of FIG. 2.
Figure 4:
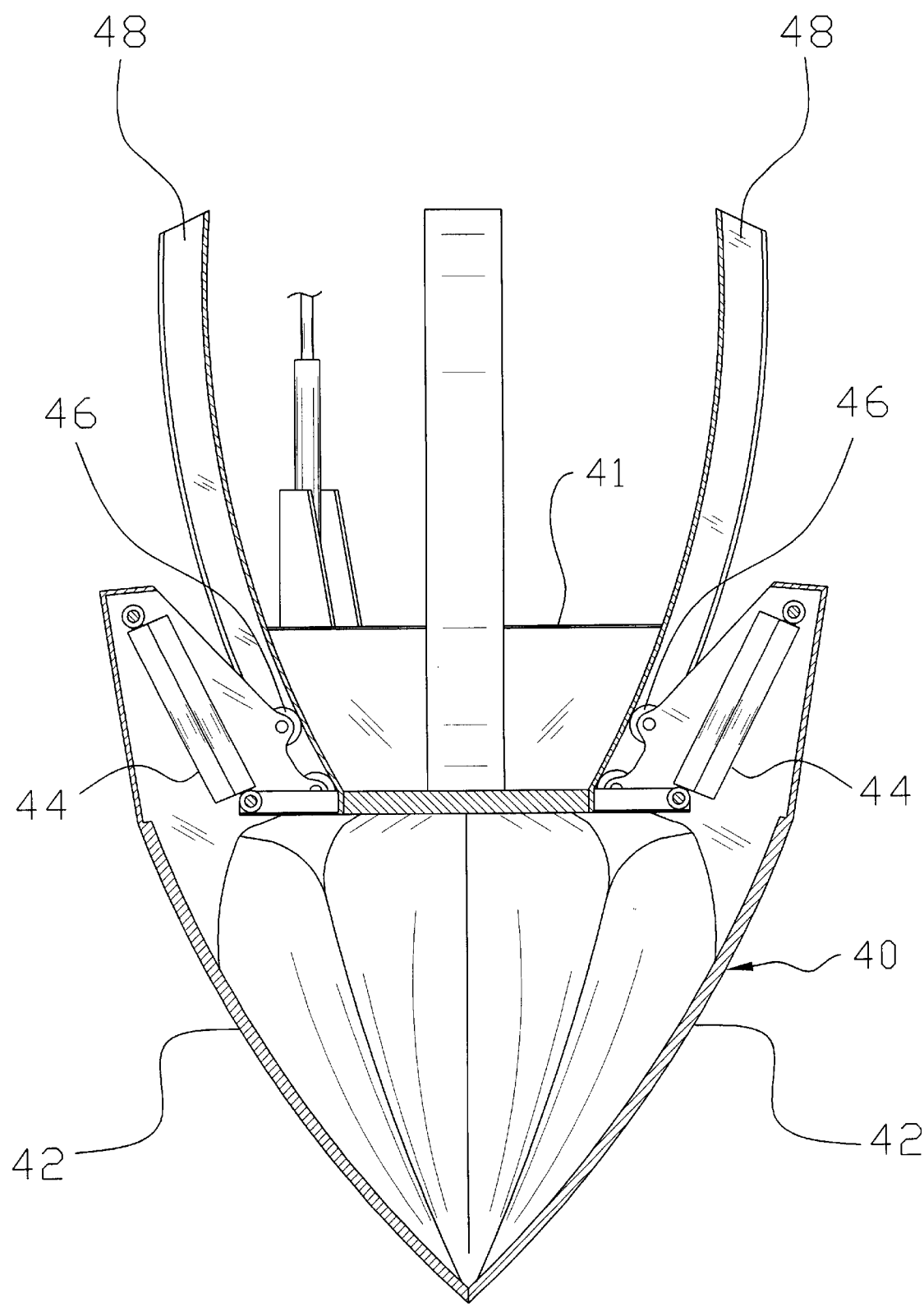
FIG. 4 is a sectional view of the digging apparatus in the closed digging position along line 4—4 of FIG. 1.

Turning now descriptively to the drawings, in which similar reference characters denote similar elements throughout the several views, FIGS. 1 through 8 illustrate a tree spade system 10, which comprises a digging apparatus 40, a lifting mechanism 30 and a tilting mechanism 20 all connected to a vehicle 12. The digging apparatus 40 when placed in the horizontal position on the vehicle 12 is locked into a secure position by the locking mechanism 50. The digging apparatus 40 is designed with a low profile to allow for the transplanting of trees without the requirement of removing the tree's lower branches. The tree spade system 10 allows for the transportation of large plants, such as trees and shrubs, safely by utilizing the locking mechanism 50 securing the digging apparatus 40 during transport.

The digging apparatus 40 includes a frame 41 that is adjustable to facilitate the alignment of the components of the digging apparatus 40 and allow for the proper placement of the plant to be removed within the digging apparatus 40. As seen in FIG. 1, the frame 41 is preferably square-shaped with one side of the square connected to the lifting mechanism 30. The frame 41, when closed, is substantially an enclosed space for surrounding a plant to be removed. As seen in FIG. 1, the frame 41 should include two pivot connections 43 which allow the frame 41 to be opened to allow the frame 41 to be placed into position next to a plant. The frame 41 may be opened and closed using commercially available means thereby surrounding the plant to be moved within the frame 41.

A track 48 is attached to each of the four corners of the frame 41. As seen in FIGS. 1 through 6, the tracks 48 are preferably of an elongated hollow square shape and are designed to properly direct the travel of the blades 42 during the digging and transplanting operation. The side of the tracks 48, opposite the side of the track 48 connected to the frame 41, includes an opening 49 running the length of the track 48. This opening 49 is designed to allow the rollers 46 connected to the blades 42 to travel freely up and down the length of the tracks 48 while keeping the rollers 46 inside the track 48.

The rollers 46 are preferably connected to the blades 42 in such a manner to allow for their free movement up and down the tracks 48. The blades 42 have upper and lower end with the lower end spoon-shaped. The upper ends of the blades 42 are designed to provide a solid frame to securely hold the rollers 46 and the first connections 45 to the dual cylinders 44.

The blades 42 are moved up and down the tracks 48 by the use of dual cylinders 44. These dual cylinders 44 are connected at one end with a first connection 45 to the blade 42 and at the other end to the second connection 47 on the frame 41. The dual cylinders 44 preferably utilize a hydraulic piston driven system to expand and contract said dual cylinders 44. However, it can be appreciated by one skilled in the art that other embodiments of the present invention may include other means for expanding and contracting the dual cylinders 44. Currently available large plant transplanting machines use a single cylinder to draw the blades 42 into the soil. By utilizing a dual cylinder 44 design the total length of the blade 42 can be significantly reduced. By this reduced shortening of the upper end of the blade 42 the digging apparatus 40 can be utilized to remove large trees without the need to remove the lower branches which would come in contact with the upper end of a conventional blade configuration.

Figure 5:
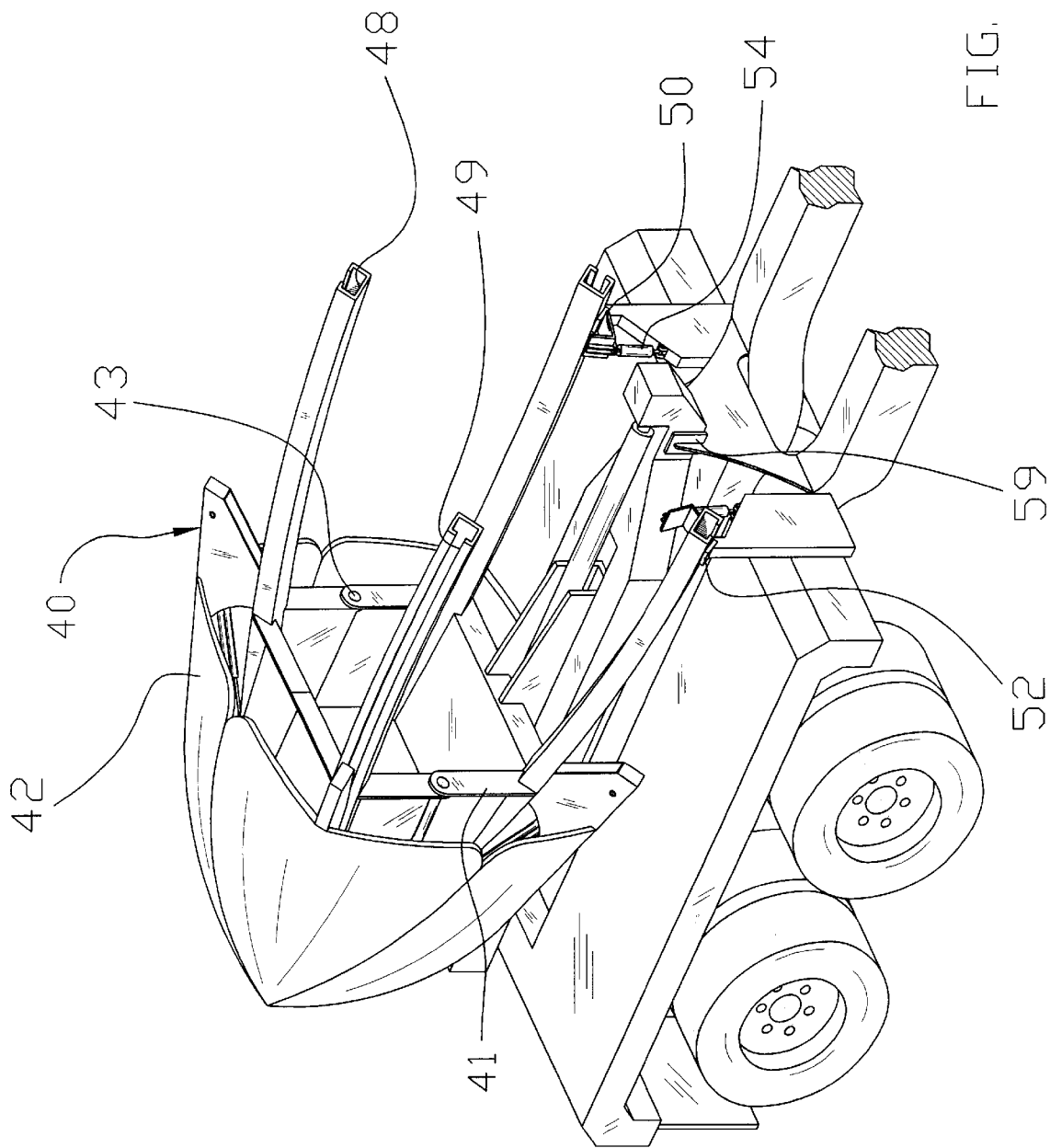
FIG. 5 is an upper perspective view of the digging apparatus with the locking mechanism open.
Figure 6:
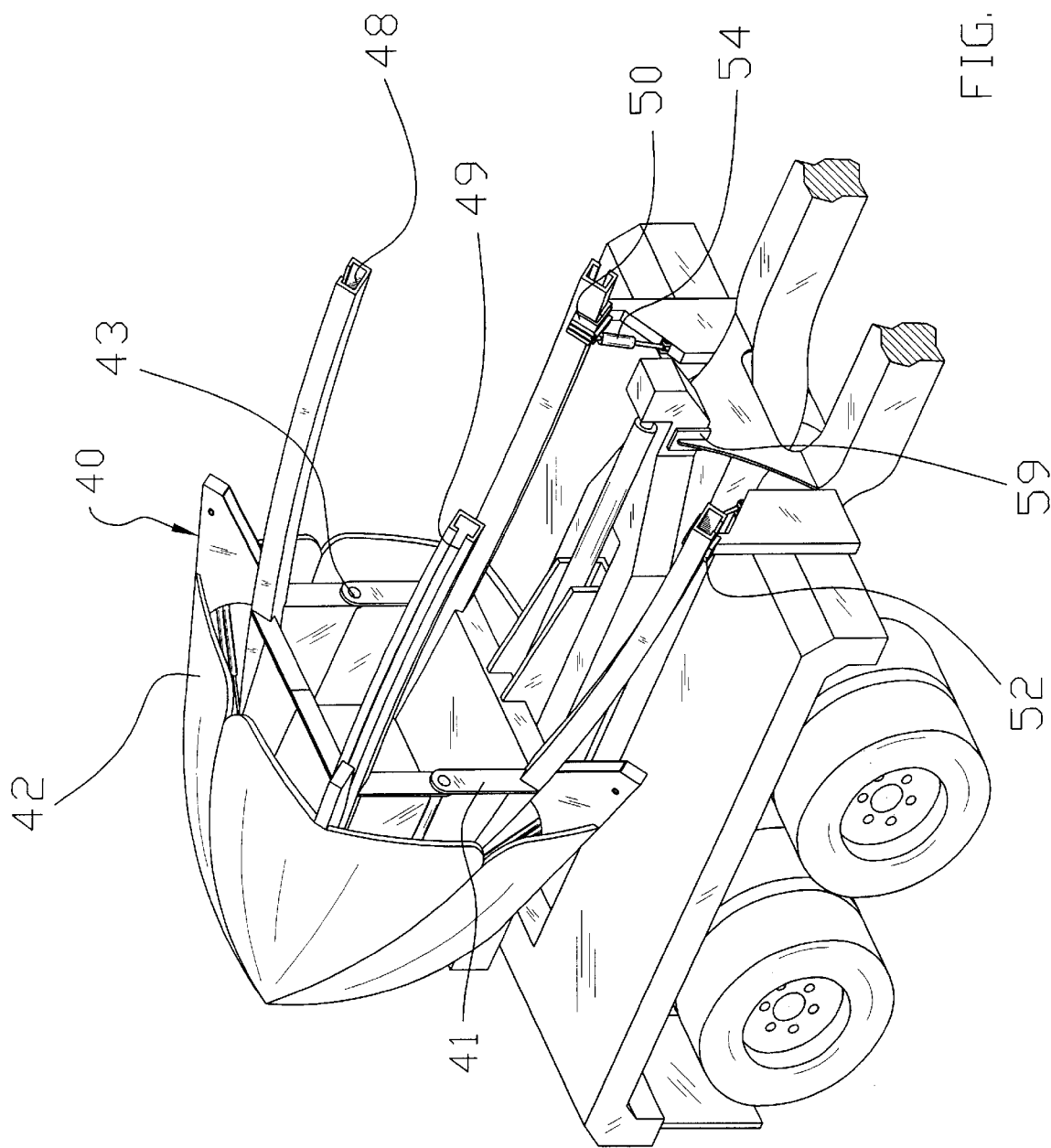
FIG. 6 is an upper perspective view of the digging apparatus with the locking mechanism closed.
Figure 7:
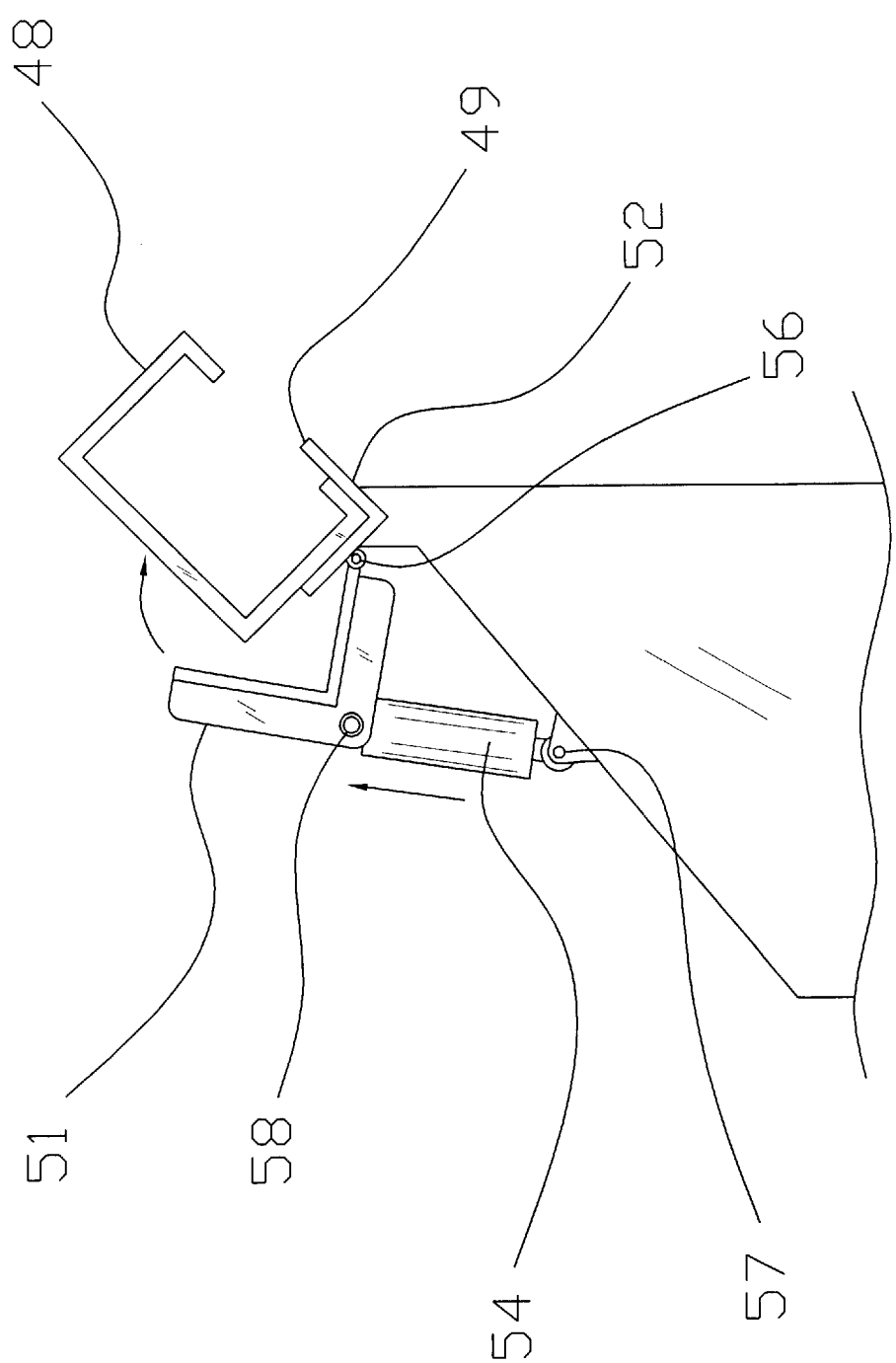
FIG. 7 is an enlarged perspective view of the locking mechanism in the open position.
Figure 8:
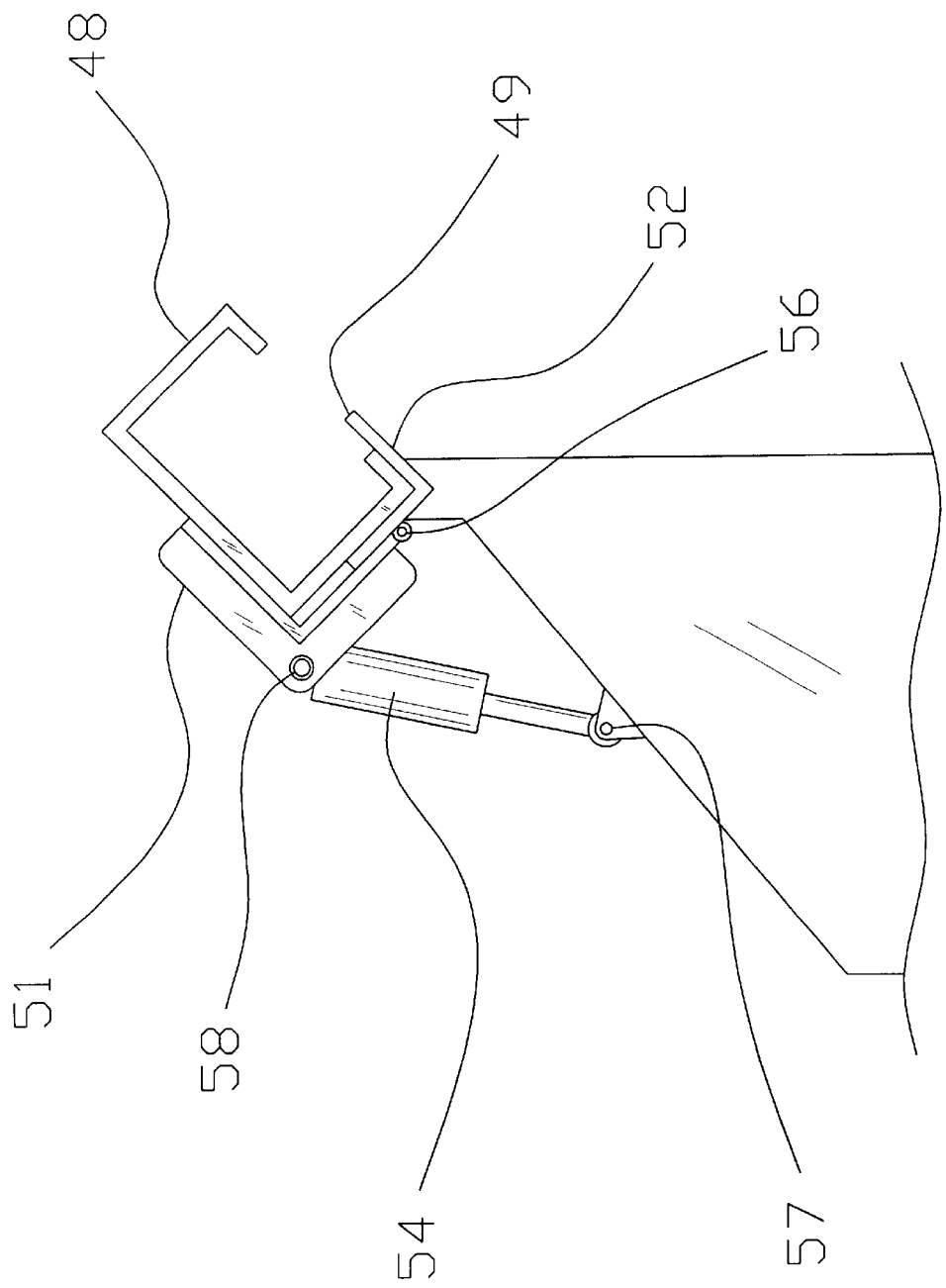
FIG. 8 is an enlarged perspective view of the locking mechanism in the closed position.

The vehicle 12, tilting mechanism 20 and lifting mechanism 30 are all standard commercially available equipment. Attached to the vehicle 12 is a locking mechanism 50 to secure the digging apparatus 40 while the tree spade system 10 is in transit. As best seen in FIG. 5, the locking mechanism 50 is secured at a position on the vehicle 12 to allow the two tracks 48 attached to the frame 41 closest to the lifting mechanism 30 to rest upon the first support 52. As seen in FIGS. 7 and 8, the brace 51 is pivotally connected to the first support 52 at the first pivot attachment 56. The brace 51 is L-shaped and connected to the single cylinder 54 at the second pivot attachment 58. The second pivot attachment 58 is preferably at a point in the center of the vertical and horizontal axis of the brace 51. The end of the single cylinder 54 is attached to the vehicle 12. The single cylinder 54 is preferably hydraulic piston driven however it can be appreciated by one skill in the art that other methods for moving the brace 51, relative to the first support 52, can be used.

In use, the vehicle 12 is backed up to the plant that the operator wishes to remove and transplant. The lifting mechanism 30 is operated to move the digging apparatus 40 off the end of the vehicle 12 and place the digging apparatus 40 on the ground in the vertical position. The pivot connections 43 are operated to open the frame 41. The frame 41 is then closed around the plant and the dual cylinders 44 are actuated. The dual cylinders 44 draw the blade 42 into the ground digging through the soil. The tracks 48 direct the blades 42 so that they join together enclosing the base of the plant and its corresponding root ball. The lifting mechanism 30 is then operated to lift the tree and root ball. The tilting mechanism 20 is used to lower the lifting mechanism 30 and digging apparatus 40 back onto the bed of the vehicle 12. As the lifting mechanism 30 moves into the horizontal position it comes to rest in the second support 59 used to secure the lifting mechanism into place. As the digging apparatus 40 moves into the horizontal position two of the tracks 48 closest to the lifting mechanism 30 come to rest upon the first supports 52. Once the tracks 48 are resting on the first supports 52 the operator can initiate the single cylinder 54 to pivotally move the brace 51 over the track 48 to securely lock the track 48 into place. With the tracks 48 securely locked into place the plant and digging apparatus 40 will maintain its proper position upon the vehicle 12 to allow for safe transport.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tree spade system, comprising:
    a vehicle;
    a tilting mechanism attached to the vehicle;
    a lifting mechanism attached to the vehicle;
    a digging apparatus attached to the lifting mechanism; and
    a locking mechanism attached to said vehicle to secure the digging apparatus, wherein said locking mechanism comprises a support attached to said vehicle, a single cylinder attached to said vehicle, and a brace pivotally attached to said support and pivotally attached to said single cylinder.

2. The tree spade system of claim 1, wherein said digging apparatus comprises:
    a frame;
    a plurality of blades;
    a plurality of rollers attached to each of said blades;
    a plurality of track sections attached to said frame for aligning the travel of said rollers; and
    a dual cylinder attached to each of said blades and to said frame.

3. The tree spade system of claim 2, wherein said frame can be pivotally opened to allow said frame to encircle the base of a plant.

4. The tree spade system of claim 2, wherein said tracks are curved to facilitate the drawing together of the plurality of blades.

5. The tree spade system of claim 2, wherein said track sections are of an elongated hollow square shaped with an opening running the length of said track sections.

6. The tree spade system of claim 2, wherein said blades are spoon-shaped.

7. The tree spade system of claim 2, wherein each of said dual cylinders are hydraulic piston driven.

8. A tree spade system, comprising:
    a vehicle;
    a tilting mechanism attached to the vehicle;
    a lifting mechanism attached to the vehicle;
    a digging apparatus wherein said digging apparatus is attached to said lifting mechanism and comprises a frame; a plurality of blades, a plurality of rollers attached to each of said blades, a plurality of track sections attached to said frame for aligning the travel of said rollers, and a dual cylinder attached to each of said blades and to said frame; and
    a locking mechanism attached to said vehicle to secure the digging apparatus;
    wherein said locking mechanism comprises:
        a support attached to said vehicle;
        a single cylinder attached to said vehicle; and
        a brace pivotally attached to said support and pivotally attached to said single cylinder.

9. The tree spade system of claim 8, wherein said frame can be pivotally opened to allow said frame to encircle a base of a plant.

10. The tree spade system of claim 8, wherein said tracks are of an elongated hollow square shaped with an opening running the length of the track.

11. The tree spade system of claim 8, wherein said tracks are curved to facilitate the drawing together of the plurality of blades when said dual cylinders are contracted.

12. The tree spade system of claim 8, wherein said blades are spoon-shaped.

13. The tree spade system of claim 8, wherein each of said dual cylinders are a hydraulic piston driven.

14. The tree spade system of claim 8, wherein said brace is L-shaped.

15. The tree spade system of claim 8, wherein said single cylinder is hydraulic piston driven.

16. The tree spade system of claim 8, wherein said track sections rest on said support when said digging apparatus is in a horizontal position.

17. The tree spade system of claim 16, wherein said brace can be pivotally moved to secure said track sections against said support.

18. A tree spade system, comprising:
   a vehicle;
   a tilting mechanism attached to the vehicle;
   a lifting mechanism attached to the vehicle;
   a digging apparatus wherein said digging apparatus is attached to said lifting mechanism and comprises a frame: a plurality of blades, a plurality of rollers attached to each of said blades, a plurality of track sections attached to said frame for aligning the travel of said rollers, and a dual cylinder attached to each of said blades and to said frame; and
   a locking mechanism attached to said vehicle to secure the digging apparatus wherein said locking mechanism comprises: a pair of supports attached to said vehicle, a pair of single cylinders attached to said vehicle, and a pair of braces pivotally attached to said pair of supports and pivotally attached to said pair of single cylinders.

19. The tree spade system of claim 18, wherein a pair of the plurality of tracks rests upon said pair of supports when said digging apparatus is in a horizontal position and said pair of braces can be moved to secured said pair of the plurality of tracks to said pair of supports.

* * * * *